US008412097B2

(12) United States Patent
Tao et al.

(10) Patent No.: US 8,412,097 B2
(45) Date of Patent: Apr. 2, 2013

(54) METHODS, ELECTRONIC DEVICES, AND COMPUTER PROGRAM PRODUCTS FOR COORDINATING BLUETOOTH AND WIRELESS LOCAL AREA NETWORK COMMUNICATION

(75) Inventors: Xiao-Jiao Tao, Jarfalla (SE); Patrick Dai Javad, Stockholm (SE)

(73) Assignee: Sony Ericsson Mobile Communications AB, Lund (SE)

( * ) Notice: Subject to any disclaimer, the term of this patent is extended or adjusted under 35 U.S.C. 154(b) by 2228 days.

(21) Appl. No.: 11/229,262

(22) Filed: Sep. 16, 2005

(65) Prior Publication Data

US 2007/0066222 A1  Mar. 22, 2007

(51) Int. Cl.
*H04B 7/00* (2006.01)
(52) U.S. Cl. .................. 455/41.2; 455/552.1; 455/63.1; 455/67.12; 370/338; 370/349
(58) Field of Classification Search ........ 455/41.1–41.3, 455/561, 414.1, 414.4, 454, 462, 463, 554.1, 455/554.2, 552.1, 426.1, 426.2, 448, 450, 455/466, 560, 556.1, 90.1; 370/445, 449, 370/346, 278, 348, 328–329, 338
See application file for complete search history.

(56) References Cited

U.S. PATENT DOCUMENTS

| 6,895,255 | B1 * | 5/2005 | Bridgelall | 455/552.1 |
| 7,099,671 | B2 * | 8/2006 | Liang | 455/450 |
| 7,190,679 | B2 * | 3/2007 | Khawand et al. | 370/278 |
| 7,197,335 | B2 * | 3/2007 | Lau | 455/561 |
| 7,277,413 | B2 * | 10/2007 | Benveniste | 370/338 |
| 7,280,801 | B2 * | 10/2007 | Dahl | 455/41.2 |
| 7,333,830 | B2 * | 2/2008 | Malone | 455/552.1 |
| 7,366,128 | B2 * | 4/2008 | Hundal et al. | 370/328 |
| 2004/0022210 | A1 * | 2/2004 | Frank et al. | 370/328 |
| 2004/0152416 | A1 * | 8/2004 | Dahl | 455/41.2 |
| 2004/0242159 | A1 * | 12/2004 | Calderon et al. | 455/63.3 |
| 2005/0025174 | A1 * | 2/2005 | Fischer et al. | 370/445 |

(Continued)

FOREIGN PATENT DOCUMENTS

| EP | 1199842 | 9/2001 |
| EP | 1207654 A2 * | 5/2002 |
| WO | WO 01/84789 | 11/2001 |

OTHER PUBLICATIONS

IEEE Standard 802.15.2-2003, IEEE Recommended Practice for Information Technology—Telecommunications and information exchange between systems—Local and metropolitan area networks—Specific requirements—Part 15.2: Coexistence of Wireless Personal Area Networks with Other Wireless Devices Operating in Unlicensed Frequency Bands.

(Continued)

*Primary Examiner* — Nay A Maung
*Assistant Examiner* — Erica Fleming-Hall
(74) *Attorney, Agent, or Firm* — Myers Bigel Sibley & Sajovec, P.A.

(57) ABSTRACT

An electronic device may be operated by providing Bluetooth communication duty cycle information to a Wireless Local Area Network (WLAN) module. A determination is made, based on the Bluetooth communication duty cycle information, if there is sufficient time during a current Bluetooth inactive communication interval to complete a WLAN communication. If it is determined that there is not sufficient time to complete the WLAN communication during the current Bluetooth inactive communication interval, then the WLAN transmission is postponed to a subsequent Bluetooth inactive communication interval.

25 Claims, 4 Drawing Sheets

U.S. PATENT DOCUMENTS

2005/0239474 A9\* 10/2005 Liang .......................... 455/454
2006/0067312 A1\* 3/2006 Ross .......................... 370/388
2007/0223441 A1\* 9/2007 Exeler et al. ................. 370/345

OTHER PUBLICATIONS

*How 802.11 b/g WLAN and Bluetooth Can Play Together*, A White Paper, 2004. www.semiconductors.phillips.com/acrobat/literature/9397/75013426.pdf.

*STLC2500 Bluetooth Radio & Digital Baseband Wireless LAN—Bluetooth Coexistence*, 2005. www.st.com/stonline/prodpres/dedicate/bluetoot/product/stlc2500/wlan.htm.

*WLAN Solutions: TNETW1130 Converged Single-Chip MAC and Baseband Processor for IEE 802.1 1a/b/g*, 2003. www.ti.com/bluetooth80211.

International Search Report and Written Opinion for International Application No. PCT/EP2006/066362, Mailed Dec. 12, 2006.

Notice of Preliminary Rejection Corresponding to Korean Patent Application No. 2008-706348; Issued: Sep. 21, 2012; Foreign Text, 3 Pages.

\* cited by examiner

METHODS, ELECTRONIC DEVICES, AND COMPUTER PROGRAM PRODUCTS FOR COORDINATING BLUETOOTH AND WIRELESS LOCAL AREA NETWORK COMMUNICATION

BACKGROUND OF THE INVENTION

The present invention relates to mobile communication devices, and, more particularly, to methods, electronic devices, and computer program products for providing Bluetooth and Wireless Local Area Network (WLAN) functionality in a single device.

Wireless networking and mobile terminals have revolutionized the way in which information can be delivered. Unfortunately, two popular wireless standards—IEEE 802.11b/g WLAN and Bluetooth-use the same 2.4 GHz frequency band. When WLAN and Bluetooth transceivers are co-located in the same device, then a common receiver/amplifier may saturate and the receiver may become desensitized. Moreover, intense bandwidth utilization when both WLAN and Bluetooth transceivers are in use simultaneously may interfere with operation of the respective error correction functions associated with the two standards. Nevertheless, it may still be desirable to provide both WLAN and Bluetooth functionality in a single device. One reason for this is that WLAN and Bluetooth have been designed for different applications. Bluetooth devices are typically used as a wireless headset, to move a data file to a Bluetooth-enabled device, e.g., a printer, and to exchange/synchronize data with a personal computer. WLAN devices, however, are often used in personal or corporate networks and/or as a connection to the Internet at hot spots, such as restaurants, hotel lobbies, and/or airports.

To allow devices to provide both WLAN and Bluetooth functionality, various Medium Access Control (MAC) protocols have been developed to avoid simultaneous transmission. One such protocol, known as Packet Traffic Arbitration (PTA), uses a time division approach for dividing access to the communication medium between the WLAN and Bluetooth transceivers. The PTA protocol, however, provides for a priority setting for Bluetooth traffic that, when enabled, will cause any WLAN communication that is in progress to be interrupted. This may result in wasted bandwidth, increased collision rates, and/or reduced WLAN network capacity.

SUMMARY OF THE INVENTION

According to some embodiments of the present invention, an electronic device may be operated by providing Bluetooth communication duty cycle information to a Wireless Local Area Network (WLAN) module. A determination is made, based on the Bluetooth communication duty cycle information, if there is sufficient time during a current Bluetooth inactive communication interval to complete a WLAN communication. If it is determined that there is not sufficient time to complete the WLAN communication during the current Bluetooth inactive communication interval, then the WLAN transmission is postponed to a subsequent Bluetooth inactive communication interval.

In other embodiments of the present invention, postponing the WLAN communication comprises beginning the WLAN communication immediately following a distributed inter-frame space (DIFS) interval in the subsequent Bluetooth inactive communication interval if it is determined that there is not sufficient time to complete the WLAN communication during the current Bluetooth inactive communication interval.

In still other embodiments of the present invention, a timer is allowed to expire in the current Bluetooth inactive communication interval before determining if there is sufficient time during the current Bluetooth inactive communication interval to complete the WLAN communication.

In still other embodiments of the present invention, the WLAN communication comprises a data frame and an acknowledgement.

In still other embodiments of the present invention, the data frame and the acknowledgement are separated in time by a short inter-frame space (SIFS) interval.

In still other embodiments of the present invention, the Bluetooth communication duty cycle information comprises an active interval time and an inactive interval time.

In still other embodiments of the present invention, the active interval time is 1.25 msec and the inactive interval time is 2.5 msec for a Bluetooth synchronous connection oriented (SCO) link using high quality voice (HV3) packets.

In still other embodiments of the present invention, the WLAN communication is performed if it is determined that there is sufficient time to complete the WLAN communication during the current Bluetooth communication interval.

Although described above primarily with respect to method aspects of the present invention, it will be understood that the present invention may be embodied as methods, electronic devices, and/or computer program products.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF PREFERRED EMBODIMENTS

Figure 1:
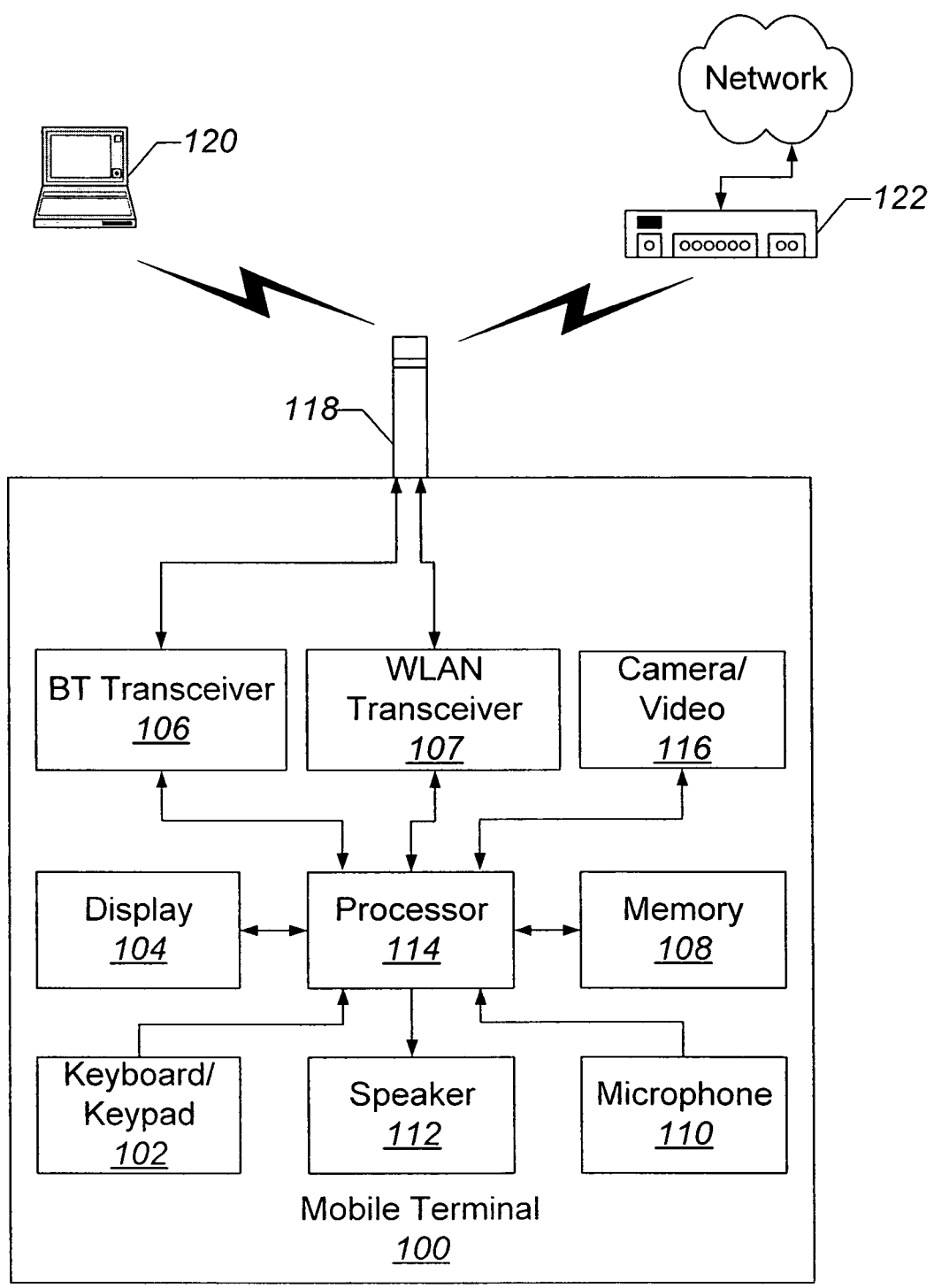
FIG. 1 is a block diagram that illustrates an electronic device/mobile terminal in accordance with some embodiments of the present invention.

While the invention is susceptible to various modifications and alternative forms specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present.

Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, electronic devices, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As used herein, the term "mobile terminal" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

For purposes of illustration, embodiments of the present invention are described herein in the context of a mobile terminal. It will be understood, however, that the present invention is not limited to such embodiments and may be embodied generally as an electronic device that comprises Bluetooth and wireless Local Area Network (WLAN) functionality.

Referring now to FIG. 1 an exemplary electronic device, such as a mobile terminal 100, in accordance with some embodiments of the present invention, includes a keyboard/keypad 102, a display 104, a Bluetooth transceiver 106, a WLAN transceiver 107, a memory 108, a microphone 110, a speaker 112, and a camera/video module 116 that communicate with a processor 114. One or both of the transceiver circuits 106 and 107 typically include a transmitter circuit and a receiver circuit, which cooperate to transmit and receive radio frequency signals to base station transceivers via an antenna 118. In accordance with various embodiments of the present invention, both the Bluetooth transceiver 106 and the WLAN transceiver 107 may share the same antenna 118 or each transceiver 106 and 107 may have a dedicated antenna associated therewith. In addition, the Bluetooth transceiver circuit 106 may facilitate wireless communication with other Bluetooth enabled devices 120 using the Bluetooth protocol. The Bluetooth protocol is an open standard for short-range and low speed wireless transmission of digital voice and data in the unlicensed 2.4 GHz band, which supports both point-to-point and multipoint applications. The WLAN transceiver circuit may facilitate wireless communication with devices 122 on a local area network using, for example, the IEEE 802.11 standard. The memory 108 may represent a hierarchy of memory that may include volatile and/or non-volatile memory, such as removable flash, magnetic, and/or optical rewritable non-volatile memory. The radio frequency signals transmitted between the mobile terminal 100 and the base station transceivers may comprise both traffic and control signals (e.g., paging signals/messages for incoming calls), which are used to establish and maintain communication with another party or destination. The radio frequency signals may also comprise packet data information, such as, for example, cellular digital packet data (CDPD) information. The foregoing components of the mobile terminal 100 may be included in many conventional mobile terminals and their functionality is generally known to those skilled in the art.

Figure 2:
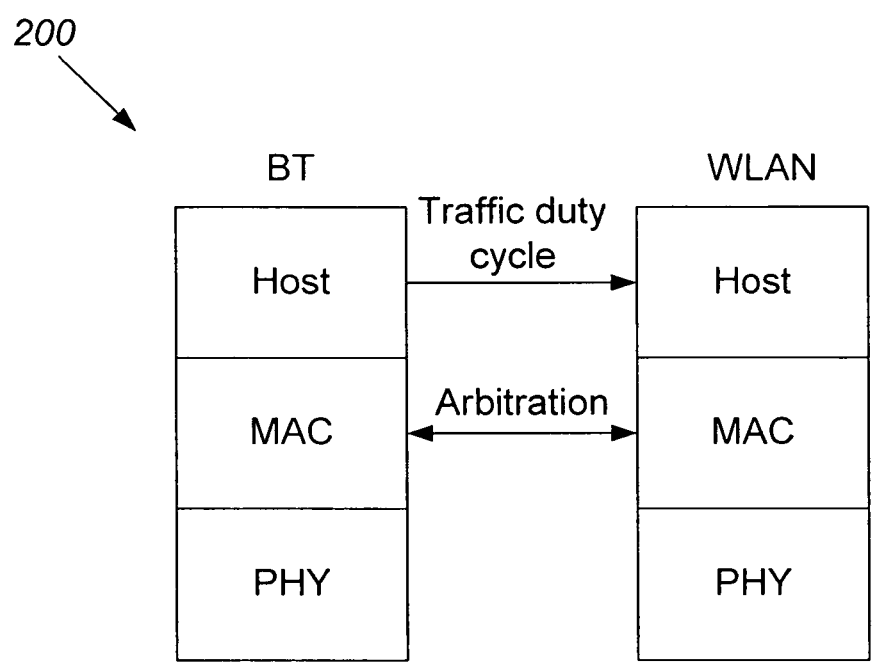
FIG. 2 is a block diagram that illustrates the partial communication stacks for the Bluetooth transceiver and the WLAN transceiver of FIG. 1.

In accordance with some embodiments of the present invention, the Bluetooth transceiver 106 and the WLAN transceiver 107 may be configured to cooperate to reduce the likelihood that a Bluetooth communication interrupts or interferes with a WLAN communication. For example, FIG. 2 illustrates the partial communication stacks 200 for the Bluetooth transceiver 106 and the WLAN transceiver 107. As shown in FIG. 2, the Host layer of the Bluetooth transceiver 106 communication stack may provide traffic duty cycle information to the Host layer of the WLAN transceiver 107 communication stack. Based on this information, arbitration may occur at the Medium Access Control (MAC) layers of the respective communication stacks to reduce interruptions/interference between Bluetooth and WLAN communications. The MAC layers cooperate with Physical layers in the respective communication stacks to transmit and receive information across a physical medium, such as air.

Although FIGS. 1 and 2 illustrate exemplary hardware/software architectures that may be used in mobile terminals, electronic devices, and the like for coordinating Bluetooth and WLAN communication in a same device, it will be understood that the present invention is not limited to such a configuration but is intended to encompass any configuration capable of carrying out operations described herein. Moreover, the functionality of the hardware/software architecture of FIGS. 1 and 2 may be implemented as a single processor system, a multi-processor system, or even a network of standalone computer systems, in accordance with various embodiments of the present invention.

Computer program code for carrying out operations of devices and/or systems discussed above with respect to FIGS. 1 and 2 may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described hereinafter with reference to flowchart and/or block diagram illustrations of methods, mobile terminals, electronic devices, data processing systems, and/or computer program products in accordance with some embodiments of the invention.

These flowchart and/or block diagrams further illustrate exemplary operations of processing image data in accordance with various embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 3:
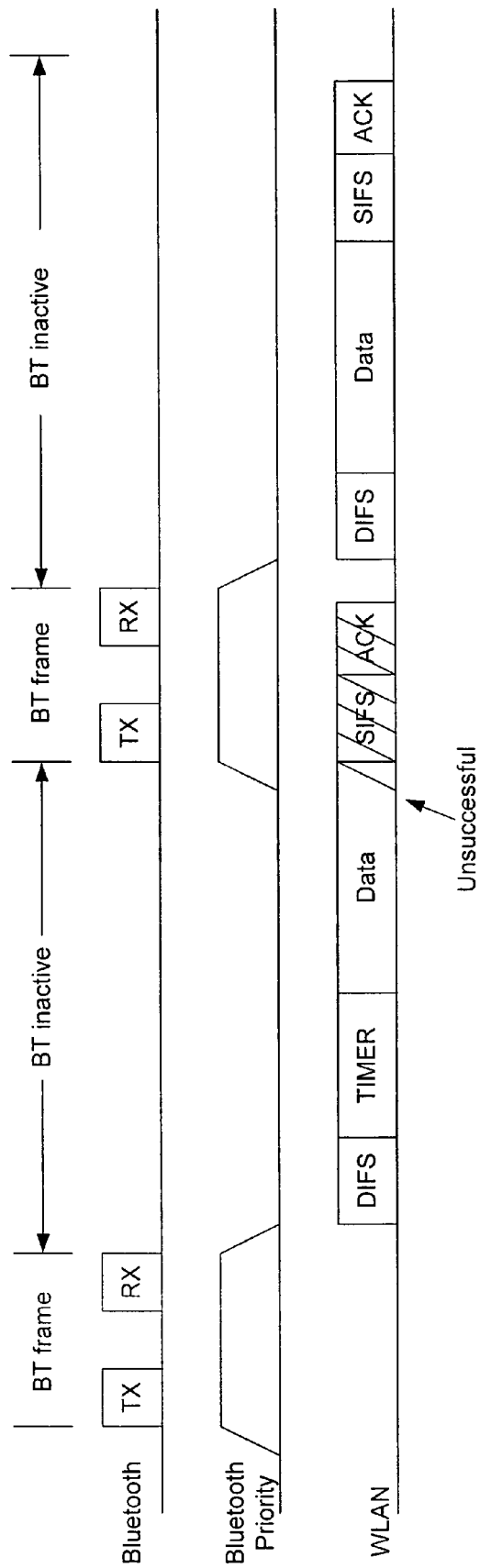
FIG. 3 is a timing diagram that illustrates the coordination of Bluetooth and Wireless Local Area Network (WLAN) communication in a single device in accordance with some embodiments of the present invention.

FIG. 3 is a timing diagram that illustrates the coordination of Bluetooth and WLAN communication in a single device in accordance with some embodiments of the present invention. As discussed above, to allow devices to provide both WLAN and Bluetooth functionality, various MAC protocols have been developed to avoid simultaneous transmission. One such protocol, known as Packet Traffic Arbitration (PTA), uses a time division approach for dividing access to the communication medium between the WLAN and Bluetooth transceivers. The PTA protocol, however, provides for a priority setting for Bluetooth traffic that, when enabled, will cause any WLAN communication that is in progress to be interrupted. This is illustrated with respect to the first WLAN transmission shown in FIG. 3. When the Bluetooth transceiver asserts the priority signal, then the Bluetooth transceiver may transmit or receive a Bluetooth frame. During the first inactive Bluetooth interval, the WLAN transceiver begins communication. The WLAN communication comprises a distributed inter-frame space (DIFS) interval, a back-off timer interval, a data frame interval, a short inter-frame space (SIFS) interval, and an acknowledgement interval. As shown in FIG. 3, however, the Bluetooth transceiver asserts the priority signal at the end of the WLAN data interval thereby interrupting the WLAN data frame, SIFS, and acknowledgement intervals.

Figure 4:
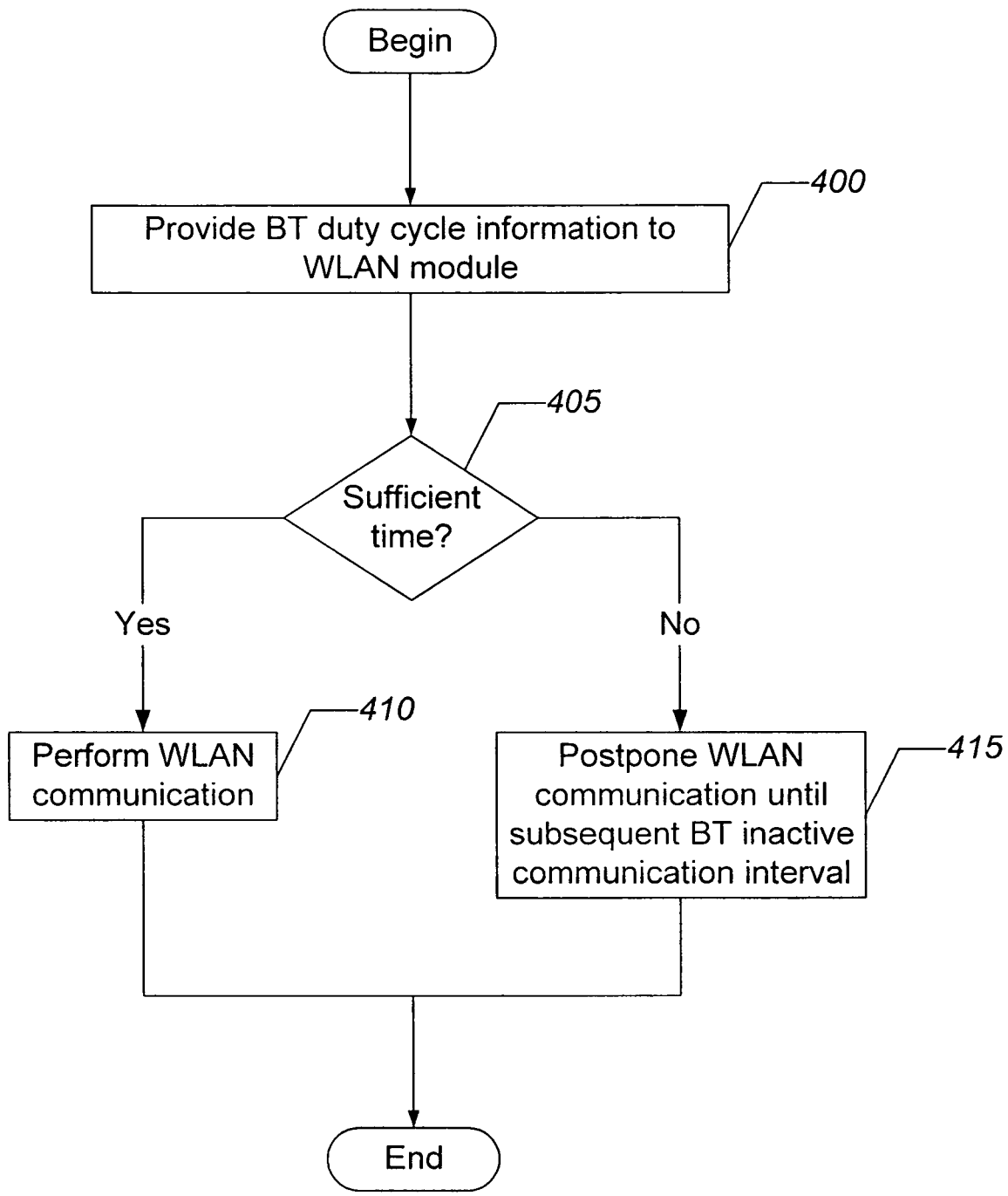
FIG. 4 is a flowchart that illustrates operations for coordinating Bluetooth and WLAN communication in a single device in accordance with some embodiments of the present invention.

Referring now to FIGS. 4 and 3, operations for coordinating Bluetooth and WLAN communication in a single device in accordance with some embodiments of the present invention begin at block 400 where the Bluetooth transceiver provides the WLAN transceiver with the Bluetooth protocol duty cycle information. According to some embodiments of the present invention, the duty cycle information comprises a Bluetooth active interval time during which a Bluetooth frame is communicated and a Bluetooth inactive interval time. In particular embodiments of the present invention, the Bluetooth active interval time is 1.25 msec and the inactive interval time is 2.5 msec for a Bluetooth synchronous connection oriented (SCO) link using high quality voice (HV3) packets.

Based on the Bluetooth protocol duty cycle information, the WLAN transceiver determines at block 405 if there is sufficient time during a current Bluetooth inactive communication interval to complete a WLAN communication. For example, referring to FIG. 3, the WLAN transceiver may wait until the back-off timer interval expires during the first Bluetooth inactive communication interval and then evaluate whether there is sufficient time remaining before the next Bluetooth active communication interval for the WLAN data-frame interval, SIFS interval, and acknowledgement interval to complete. If there is sufficient time for the WLAN communication to complete, then the WLAN communication is performed at block 410. Because there is insufficient time in the example shown in FIG. 3, the WLAN transceiver would not proceed with the initial WLAN communication shown in FIG. 3. Rather, the WLAN transceiver postpones the WLAN until the subsequent Bluetooth inactive communication interval at block 415 in accordance with some embodiments of the present invention.

The back-off timer, which is independent of Bluetooth and/or coexistence of Bluetooth with WLAN technologies, may be used to reduce collisions when multiple actors contend for access to a communication medium. If the communication medium is busy, then an actor will defer until the medium is determined to be idle without interruption for a period of time equal to the DIFS interval when the last frame detected on the medium was received correctly, or until the medium is determined to be idle without interruption for another period of time when the last frame detected on the medium was not received correctly. After this DIFS time (or other time) interval, an actor may generate a random back-off time period for an additional deferral time before transmitting, unless the back-off timer already contains a nonzero value. This case, the selection of a random number for the back-off time interval is not needed.

As illustrated in FIG. 3, the WLAN communication in the subsequent Bluetooth inactive communication interval begins immediately after the DIFS interval without the use of a back-off timer in accordance with some embodiments of the present invention. Thus, the WLAN communication in the subsequent Bluetooth inactive communication interval may comprise a DIFS interval, a data frame interval, a SIFS interval, and an acknowledgement interval.

Advantageously, some embodiments of the present invention may allow devices to incorporate both Bluetooth and WLAN technology while reducing the likelihood that Bluetooth and WLAN communications interrupt or interfere with each other.

The flowchart of FIG. 4 illustrates the architecture, functionality, and operations of embodiments of methods, electronic devices, and/or computer program products for coordinating Bluetooth and WLAN communication in a single device. In this regard, each block represents a module, segment, or portion of code, which comprises one or more executable instructions for implementing the specified logical function(s). It should also be noted that in other implementations, the function(s) noted in the blocks may occur out of the order noted in FIG. 4. For example, two blocks shown in succession may, in fact, be executed substantially concurrently or the blocks may sometimes be executed in the reverse order, depending on the functionality involved.

Many variations and modifications can be made to the preferred embodiments without substantially departing from the principles of the present invention. All such variations and modifications are intended to be included herein within the scope of the present invention, as set forth in the following claims.

That which is claimed:

1. A method of operating an electronic device, comprising:
    providing Bluetooth communication duty cycle information to a Wireless Local Area Network (WLAN) module;
    determining, based on the Bluetooth communication duty cycle information, if there is sufficient time during a current Bluetooth inactive communication interval to complete a WLAN communication; and
    postponing the WLAN transmission to a subsequent Bluetooth inactive communication interval if it is determined that there is not sufficient time to complete the WLAN communication during the current Bluetooth inactive communication interval.

2. The method of claim 1, wherein postponing the WLAN communication comprises:
    beginning the WLAN communication immediately following a distributed inter-frame space (DIFS) interval in the subsequent Bluetooth inactive communication interval if it is determined that there is not sufficient time to complete the WLAN communication during the current Bluetooth inactive communication interval.

3. The method of claim 1, wherein the WLAN communication comprises a data frame and an acknowledgement.

4. The method of claim 3, wherein the data frame and the acknowledgement are separated in time by a short inter-frame space (SIFS) interval.

5. The method of claim 1, wherein the Bluetooth communication duty cycle information comprises an active interval time and an inactive interval time.

6. The method of claim 5, wherein the active interval time is 1.25 msec and the inactive interval time is 2.5 msec for a Bluetooth synchronous connection oriented (SCO) link using high quality voice (HV3) packets.

7. The method of claim 1, further comprising:
    performing the WLAN communication if it is determined that there is sufficient time to complete the WLAN communication during the current Bluetooth communication interval.

8. An electronic device, comprising:
    a Bluetooth transceiver module that is configured to provide Bluetooth communication duty cycle information;
    a Wireless Local Area Network (WLAN) transceiver module that is configured to obtain the Bluetooth communication duty cycle information and to determine, based on the Bluetooth communication duty cycle information, if there is sufficient time during a current Bluetooth inactive communication interval to complete a WLAN communication and to postpone the WLAN transmission to a subsequent Bluetooth inactive communication interval if it is determined that there is not sufficient time to complete the WLAN communication during the current Bluetooth inactive communication interval.

9. The electronic device of claim 8, wherein the WLAN transceiver module is further configured to begin the WLAN communication immediately following a distributed inter-frame space (DIFS) interval in the subsequent Bluetooth inactive communication interval if it is determined that there is not sufficient time to complete the WLAN communication during the current Bluetooth inactive communication interval.

10. The electronic device of claim 8, wherein the WLAN communication comprises a data frame and an acknowledgement.

11. The electronic device of claim 10, wherein the data frame and the acknowledgement are separated in time by a short inter-frame space (SIFS) interval.

12. The electronic device of claim 8, wherein the Bluetooth communication duty cycle information comprises an active interval time and an inactive interval time.

13. The electronic device of claim 12, wherein the active interval time is 1.25 msec and the inactive interval time is 2.5 msec for a Bluetooth synchronous connection oriented (SCO) link using high quality voice (HV3) packets.

14. The electronic device of claim 8, wherein the WLAN transceiver module is further configured to perform the WLAN communication if it is determined that there is sufficient time to complete the WLAN communication during the current Bluetooth communication interval.

15. The electronic device of claim 8, wherein the electronic device is a mobile terminal.

16. A computer program product for operating an electronic device, comprising:
    a computer readable storage medium having computer readable program code embodied therein, the computer readable program code comprising:
    computer readable program code configured to provide Bluetooth communication duty cycle information to a Wireless Local Area Network (WLAN) module;
    computer readable program code configured to determine, based on the Bluetooth communication duty cycle information, if there is sufficient time during a current Bluetooth inactive communication interval to complete a WLAN communication; and
    computer readable program code configured to postpone the WLAN transmission to a subsequent Bluetooth inactive communication interval if it is determined that there is not sufficient time to complete the WLAN communication during the current Bluetooth inactive communication interval.

17. The computer program product of claim 16, wherein the computer readable program code configured to postpone the WLAN communication comprises:
    computer readable program code configured to begin the WLAN communication immediately following a distributed inter-frame space (DIFS) interval in the subsequent Bluetooth inactive communication interval if it is determined that there is not sufficient time to complete the WLAN communication during the current Bluetooth inactive communication interval.

18. The computer program product of claim 16, wherein the WLAN communication comprises a data frame and an acknowledgement.

19. The computer program product of claim 18, wherein the data frame and the acknowledgement are separated in time by a short inter-frame space (SIFS) interval.

20. The computer program product of claim 16, wherein the Bluetooth communication duty cycle information comprises an active interval time and an inactive interval time.

21. The computer program product of claim 20, wherein the active interval time is 1.25 msec and the inactive interval time is 2.5 msec for a Bluetooth synchronous connection oriented (SCO) link using high quality voice (HV3) packets.

22. The computer program product of claim 16 further comprising:
   computer readable program code configured to perform the WLAN communication if it is determined that there is sufficient time to complete the WLAN communication during the current Bluetooth communication interval.

23. The method of claim 1 further comprising:
   allowing a timer to expire in the current Bluetooth inactive communication interval before determining if there is sufficient time during the current Bluetooth inactive communication interval to complete the WLAN communication.

24. The electronic device of claim 8, wherein the WLAN transceiver module is further configured to allow a timer to expire in the current Bluetooth inactive communication interval before determining if there is sufficient time during the current Bluetooth inactive communication interval to complete the WLAN communication.

25. The computer program product of claim 16, further comprising:
   computer readable program code configured to allow a timer to expire in the current Bluetooth inactive communication interval before determining if there is sufficient time during the current Bluetooth inactive communication interval to complete the WLAN communication.

* * * * *

UNITED STATES PATENT AND TRADEMARK OFFICE
CERTIFICATE OF CORRECTION

PATENT NO.         : 8,412,097 B2                                    Page 1 of 1
APPLICATION NO.    : 11/229262
DATED              : April 2, 2013
INVENTOR(S)        : Tao et al.

It is certified that error appears in the above-identified patent and that said Letters Patent is hereby corrected as shown below:

On Title Page:
Item 75, Inventor: Correct "Patrick Dai Javad, Stockholm (SE)"
                   to read -- Patrik Dai Javad, Stockholm (SE) --

Signed and Sealed this
Twenty-seventh Day of May, 2014

Michelle K. Lee
*Deputy Director of the United States Patent and Trademark Office*